United States Patent
Khamis et al.

(10) Patent No.: US 11,862,904 B2
(45) Date of Patent: Jan. 2, 2024

(54) MULTIMODAL SENSOR-BASED STATE OF CONNECTION MONITORING FOR A 7-PIN TRAILER CABLE OR THE LIKE, AND A TRAILER BREAKAWAY CABLE

(71) Applicant: GM GLOBAL TECHNOLOGY OPERATIONS LLC, Detroit, MI (US)

(72) Inventors: Alaa M. Khamis, Courtice (CA); Yun Qian Miao, Waterloo (CA); Ralph David Schlottke, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 282 days.

(21) Appl. No.: 17/457,009

(22) Filed: Nov. 30, 2021

(65) Prior Publication Data

US 2023/0170652 A1 Jun. 1, 2023

(51) Int. Cl.
*H01R 13/66* (2006.01)
*H01R 13/42* (2006.01)

(52) U.S. Cl.
CPC ......... *H01R 13/6683* (2013.01); *H01R 13/42* (2013.01); *H01R 2201/26* (2013.01)

(58) Field of Classification Search
CPC .......................... H01R 13/6683; H01R 13/42; H01R 2201/26; B60D 1/28; B60D 1/62; B60D 1/06; B60D 1/185; B60D 1/243; B60D 1/26; B60D 1/30; B60D 1/015; B60D 1/242; B60D 1/58; B60D 1/64; B62D 53/10; B62D 59/04; B62D 53/085; B62D 53/12
USPC ....................................................... 340/431
See application file for complete search history.

(56) References Cited

U.S. PATENT DOCUMENTS

| | | | | |
|---|---|---|---|---|
| 4,846,697 A * | 7/1989 | Rodgers | ................... | B60D 1/62 439/35 |
| 5,492,204 A * | 2/1996 | Wallace | ................ | B60T 11/107 280/446.1 |
| 6,072,389 A * | 6/2000 | Strasburger | ............. | B60T 17/22 340/453 |
| 8,701,842 B2 * | 4/2014 | Anderson | ................. | B60T 7/20 188/112 R |
| 9,154,746 B2 * | 10/2015 | Kageta | ............... | H01R 13/6691 |
| 10,259,390 B2 * | 4/2019 | Zhang | ........................ | B60R 1/00 |
| 10,647,369 B2 * | 5/2020 | Weaver | ............... | H04W 84/042 |
| 10,688,839 B1 * | 6/2020 | Slade | ........................ | B60D 1/64 |
| 10,926,594 B2 * | 2/2021 | Slade | ........................ | B60D 1/64 |

(Continued)

*Primary Examiner* — Eric Blount
(74) *Attorney, Agent, or Firm* — Lorenz & Kopf LLP

(57) ABSTRACT

Systems, Methods, and Apparatuses are provided for monitoring cable connections between a trailer and vehicle. The system includes a monitoring device disposed within the vehicle; and a trailer cable and a breakaway trailer cable that provide a set of cable connections, the monitoring device is configured to: monitor the set of cable connections from connection data generated by a set of multimodal sensors integrated with the vehicle about statuses of the cable connections between the trailer and the vehicle; initiate a monitor function upon detection of a presence of the trailer connected to the vehicle by at least one sensor of the set of multimodal sensors integrated with the vehicle; and determine the statuses of the cable connections by fusing together using an information fusion algorithm one or more types of signal data from the set of multimodal sensors comprising optical signal data, radio signal data, and range signal data.

20 Claims, 6 Drawing Sheets

(56) References Cited

U.S. PATENT DOCUMENTS

| | | | |
|---|---|---|---|
| 10,926,954 B2* | 2/2021 | Mattern | G06Q 10/087 |
| 11,117,556 B2* | 9/2021 | Fry | B60T 7/22 |
| 11,697,314 B2* | 7/2023 | Slade | B60R 16/0239 |
| | | | 439/35 |
| 2016/0214551 A1* | 7/2016 | Armacost | B60D 1/36 |
| 2017/0305215 A1* | 10/2017 | Scheips | B60D 1/06 |
| 2018/0099712 A1* | 4/2018 | Bean | G08B 13/126 |
| 2018/0138644 A1* | 5/2018 | Kageta | H01R 43/26 |
| 2020/0130745 A1* | 4/2020 | Cooke | B60D 1/64 |
| 2020/0171901 A1* | 6/2020 | Pampattiwar | B60Q 1/305 |
| 2020/0174055 A1* | 6/2020 | Pampattiwar | H04L 12/40013 |
| 2020/0391562 A1* | 12/2020 | Abdel-Rahman | B60W 10/20 |
| 2021/0046987 A1* | 2/2021 | Bean | H04L 12/2803 |
| 2022/0041142 A1* | 2/2022 | Clifford | G07C 5/0833 |
| 2023/0182518 A1* | 6/2023 | Pampattiwar | H04B 3/542 |
| | | | 280/420 |

* cited by examiner

MULTIMODAL SENSOR-BASED STATE OF CONNECTION MONITORING FOR A 7-PIN TRAILER CABLE OR THE LIKE, AND A TRAILER BREAKAWAY CABLE

INTRODUCTION

The present disclosure relates generally to methods and systems for monitoring the connection status of the connector pin trailer cable and the trailer breakaway cable connecting the trailer to the vehicle. More specifically, aspects of the present disclosure relate to systems, methods, and devices for using a set of multimodal sensors integrated with the vehicle for determining statuses of the cable connections by fusing together multiple types of signal data of optical signal data, radio signal data, and range signal data.

The statuses of cable connections between a vehicle and a trailer during a towing operation are dynamic by virtue of the vehicle trailer operations. In instances, the cable connections can become loose or even undone. Further, when operating a vehicle trailer combination, the braking operations of a vehicle are significantly changed requiring proper braking light and other trailer indicators proper working relevant to safe operations, and applying the appropriate type of braking for an operating vehicle trailer speed. The use of cable pin connectors (e.g., a seven-point connector) enables connecting electrical components of the trailer such as the turn signals and brake lights of the trailer to electrical control systems of the vehicle. Often during a towing operation, a status check of the vehicle connected to the trailer is required to ensure that the trailer systems including brakes and brake lights are operating properly. The status check requires physically walking around the vehicle and performing a manual inspection to ensure that the connector cable, the breakaway cable is operating properly. In instances, two people may be necessary to perform the status check with one person operating the vehicle controlling the operation of brake lights etc., and the other persons observing the trailer to ensure that the lights are actually working.

It is desired to improve the ability to perform status checks of the cable connections by enabling improved systems, methods, and apparatuses for monitoring the connection status or the 7-pin (or other pin connectors) cable connector and the trailer breakaway cable by using a multimodal sensor-based sensor check and by generating a set of actions on the connector cable statuses taking into account vehicle speed using calibrated speed thresholds.

Furthermore, other desirable features and characteristics of the present invention will become apparent from the subsequent detailed description and the appended claims, taken in conjunction with the accompanying drawings and the foregoing technical field and background.

SUMMARY

Disclosed herein are vehicle control systems, methods and apparatuses and related control logic for vehicle systems, methods, and apparatuses for making and methods for operating such systems, and motor vehicles equipped with onboard control systems.

By way of example, and not limitation, there are presented various embodiments of systems for monitoring multiple cable connections between a trailer and a vehicle. The system includes a trailer cable monitoring device disposed within the vehicle; a trailer cable; and a breakaway trailer cable; wherein the trailer cable and the breakaway trailer cable are configured to provide a set of cable connections between the trailer and the vehicle, wherein the trailer cable monitoring device is configured to: monitor the set of cable connections from connection data generated by a set of multimodal sensors integrated with the vehicle about statuses of the cable connections between the trailer and the vehicle; initiate a monitor function upon detection of a presence of the trailer connected to the vehicle by at least one sensor of the set of multimodal sensors integrated with the vehicle; and determine the statuses of the cable connections by fusing together using an information fusion algorithm one or more types of signal data from the set of multimodal sensors including optical signal data, radio signal data, and range signal data.

In at least one embodiment, the system further includes: wherein the trailer cable monitoring device is configured to: initiate the monitor function by a trailer interface module (TIM) based trailer presence detection of current consumption by a trailer braking light.

In at least one embodiment, the system further includes: wherein the trailer cable monitoring device is configured to: initiate the monitor function by a rear-view camera (RVC) based trailer detection of a coupler at a hitch location located within an RVC view.

In at least one embodiment, the system further includes: wherein the trailer cable includes at least one cable connector including a 5-pin cable connector, a 6-pin cable connector, a 7-pin cable connector, a 13-pin cable connector, and a 15-pin cable connector.

In at least one embodiment, the system further includes: wherein the trailer cable monitoring device is configured to: implement an action state machine associated with one or more vehicle states including a stationary vehicle, a low-speed vehicle, and a high-speed vehicle.

In at least one embodiment, the system further includes: wherein the trailer cable monitoring device is configured to: implement the action state machine that receives a set of inputs of vehicle operating attributes including vehicle speed, and calibrated speed thresholds, and the statuses of the cable connections, and the trailer breakaway cable.

In at least one embodiment, the system further includes: the action state machine generates one or more action sets based on a combination set of logical pairs including a cable connector state and a brake action state, and with a respective vehicle action state of the stationary vehicle, the low-speed vehicle, and the high-speed vehicle.

In at least one embodiment, the system further includes: wherein the one or more action sets include alerts of no action, brake cable alert, cable connector cable alert, safety walkthrough, recommend vehicle brake, avoid hard brake, slow down safely, and pull over.

In at least one embodiment, the system further includes: wherein the trailer cable monitoring device is configured to: implement an information fusion algorithm based on different weighting associated with a set of multiple probability detection inputs including probabilities of detection of the optical signal data, probabilities of detection of the radio signal data, and probabilities of detections of the range data received by one or more sensors of the set of multimodal sensors.

In at least one embodiment, the system further includes: wherein the trailer cable monitoring device is configured to: monitor the set of cable connections from the connection data generated by the set of multimodal sensors based on priori information that includes at least signal quality, weather conditions, and time of data.

In another exemplary embodiment, a method for monitoring multiple cable connections between a trailer and a vehicle is provided. The method includes configuring a trailer cable monitoring device that is disposed within the vehicle for monitoring a set of cable connections of a trailer cable, and a breakaway trailer cable between the trailer and the vehicle by monitoring statuses of the set of cable connections based on connection data generated by a set of multimodal sensors integrated with the vehicle; initiating a monitor function upon detection of a presence of the trailer connected to the vehicle by at least one sensor of the set of multimodal sensors integrated with the vehicle; and determining the statuses of cable connections by fusing together using an information fusion algorithm one or more types of signal data from the set of multimodal sensors including optical signal data, radio signal data, and range signal data.

In at least one exemplary embodiment, the method further includes initiating, by the trailer cable monitoring device, by a trailer interface module (TIM) based trailer presence detection of current consumption by a trailer braking light.

In at least one exemplary embodiment, the method further includes initiating, by the trailer cable monitoring device, the monitor function by a rear-view camera (RVC) based trailer detection of a coupler at a hitch location located within an RVC view.

In at least one exemplary embodiment, the method further includes wherein the trailer cable including at least one cable connector of a 7-pin cable connector type.

In at least one exemplary embodiment, the method further includes implementing, by the trailer cable monitoring device, an action state machine associated with one or more vehicle states including a stationary vehicle, a low-speed vehicle, and a high-speed vehicle.

In at least one exemplary embodiment, the method further includes applying, by the trailer cable monitoring device, the action state machine by receiving a set of inputs of vehicle operating attributes including vehicle speed, and calibrated speed thresholds, and statuses of cable connections, and the trailer breakaway cable.

In at least one exemplary embodiment, the method further includes generating, by the action state machine, the one or more action sets based on a combination set of logical pairs including a cable connector state and a brake action state, and with a respective vehicle action state of the stationary vehicle, the low-speed vehicle, and the high-speed vehicle wherein the one or more action sets include at least an alert with an image of the cable connection state associated with the alert.

In at least one exemplary embodiment, the method further includes implementing, by the trailer cable monitoring device, an information fusion algorithm based on different weighting associated with a set of multiple probability detection inputs including probabilities of detection of the optical signal data, probabilities of detection of the radio signal data, and probabilities of detections of the range data received by one or more sensors of the set of the multimodal sensors.

In at least one exemplary embodiment, the method further includes monitoring, by the trailer cable monitoring device, the set of cable connections from the connection data generated by the set of multimodal sensors based on priori information that includes at least signal quality, weather conditions, and time of data.

In yet another exemplary embodiment, an apparatus to monitor cable connections between a trailer and a vehicle is provided. The apparatus includes a processor that is disposed in a trailer cable monitor device and is programmed with a set of instructions to monitor connection statuses of a trailer cable and a breakaway cable; the processor is configured to receive connection data generated by a set of multimodal sensors integrated with the vehicle about the statuses of the cable connections between the trailer and the vehicle; the processor is configured to initiate a monitor function upon detection of a presence of the trailer connected to the vehicle by at least one sensor of the set of multimodal sensors integrated with the vehicle to implement an information fusion algorithm based on different weighting associated with a set of multiple probability detection inputs including probabilities of detection of optical signal data, probabilities of detection of the radio signal data, and probabilities of detections of the range data received by one or more sensors of the set of the multimodal sensors; the processor is configured to fuse together using an information fusion algorithm one or more types of signal data from the set of multimodal sensors including the optical signal data, radio signal data, and range signal data to determine the statuses of the cable connections; and the processor is configured to implement an action state machine that receives a set of inputs of vehicle operating attributes including vehicle speed and calibrated speed thresholds, and the statuses of the cable connections to generate one or more action alerts.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to an application-specific integrated circuit (ASIC), an electronic circuit, a processor (shared, dedicated, or group) and memory that executes one or more software or firmware programs, a combinational logic circuit, and/or other suitable components that provide the described functionality.

Figure 1:
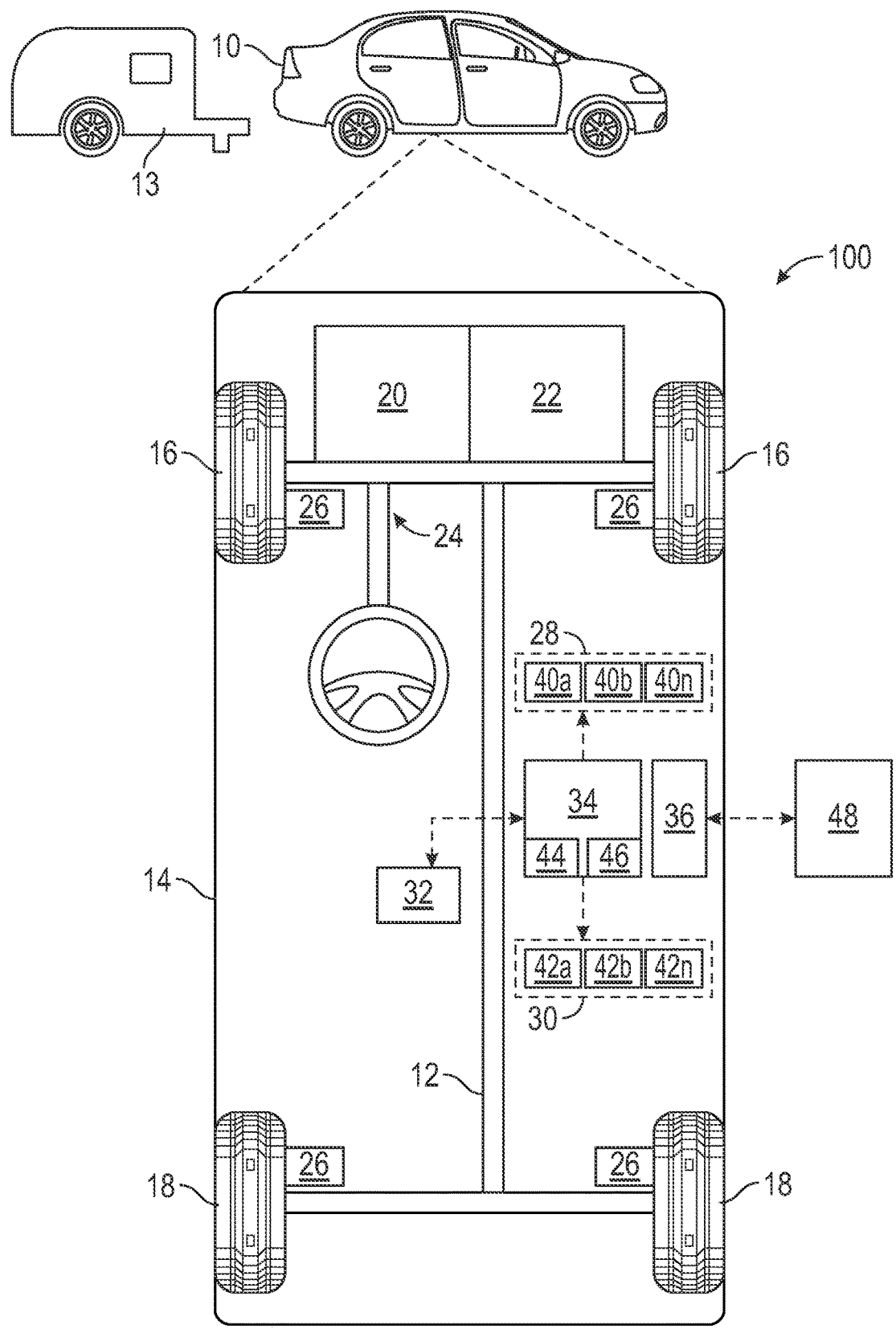
FIG. 1 illustrates a diagram of an exemplary vehicle equipped to connect to a trailer of various types having various trailer configurations is shown in accordance with various embodiments.

Turning now to FIG. 1, an exemplary vehicle 10 equipped to connect to a trailer 13 of various types having various trailer 13 configurations is shown in accordance with various embodiments. The exemplary vehicle 10 is shown to include a multimodal sensing system 100 in accordance with various embodiments. The multimodal sensing system 100 provides for a system 100 to continuously monitor the connection status of the 7-pin trailer cable and the trailer breakaway cable and notifies the driver in case of disconnection also proactively recommending actions to be taken to mitigate potential risks.

In embodiments, the breakaway cable can be broadly construed to include an electronic brake cable, or "eBrake" cable (i.e., the references to a "breakaway" cable, and "eBrake" cable are interchangeable).

In embodiments, the system 100 monitors the connection status of the 7-pin trailer cable and the trailer breakaway cable and is initiated by a trailer presence detection module to start the connection condition monitoring feature once a trailer is detected and provides a set of sensors to monitor the multimodal sensor-based 7-pin trailer cable and breakaway cable switch/battery. System 100 includes an information fusion methodology to integrate the unimodal estimations taking into consideration the level of uncertainty of each sensing modality and available prior information and implements an action state machine that generates alerts and recommends actions to be taken based on the connection status taking into consideration the vehicle speed & calibratable speed threshold.

In embodiments, the system 100 allows access of input/output devices of the trailer 13 to vehicle applications of the vehicle 10 and/or access of input/output devices of the vehicle 10 to trailer applications of the trailer 13, and the system 100 can be configured to implement a distributed agreement and protocol to propagate trailer information (such as the multimodal sensor signals) within the architecture. The new trailer information can be leveraged by existing vehicle applications (e.g., brake control, active safety applications, autonomous driving applications, service/diagnostics applications, etc.) and/or to create new vehicle applications.

In embodiments, the system 100 implements various modules or applications that include a trailer presence detection to start the connection condition monitoring feature once a trailer is detected, initiating the monitoring of the multimodal sensor-based 7-pin trailer cable and breakaway cable switch/battery, using information fusion processes to integrate the unimodal estimations and taking into consideration the level of uncertainty of each sensing modality and available prior information, and further implementing an action state machine that generates alerts and recommends actions to be taken based on the cable connection status detected which also takes into consideration the vehicle speed, and calibratable speed threshold.

System 100 continuously monitors the connection status of the 7-pin trailer cable and the trailer breakaway cable and notifying the driver in case of disconnection and proactively recommends actions to be taken to mitigate any potential risks The system 100 in embodiments, includes a connection condition monitoring feature that starts by detecting the trailer presence using Trailer-Interface (TIM)-based trailer presence detection and RVC-based trailer presence detection. For example, the TIM-based trailer presence detection may detect the brake lighting current consumption to determine the trailer 13 presence. The RVC-based trailer presence detection module may detect a coupler at the hitch ball location in the RVC View and determine the trailer 13 presence.

In embodiments, the system 100 may implement a Multimodal sensor 7-pin trailer cable monitoring module that uses vision data from rear view camera (RVC) and radio signals from ultrawideband and Bluetooth® and/or range signals from ultrasonic/radar/lidar sensor to identify the state of connection of the 7-pin trailer cable. For example, using the RVC data, the position of the 7-pin socket is fixed with respect to the rear bumper, zooming a small window and detecting cable status at this end is a feasible task. The vision-based cable detection starts by auto-detecting the region of interest referring to the center of the rear bumper. The rear bumper is then segmented based on optical flow followed by segmenting the foreground by comparing road texture.

In embodiments, a color sticker may be added on the cable to assist in robustly identifying not-plugged, not firmly-plugged, or loosely-plugged cables.

In embodiments, the system 100 may implement a multimodal sensor trailer breakaway cable monitoring module that uses vision data from RVC and radio signals from ultrawideband and Bluetooth® transmissions, and/or range signals from ultrasonic/radar/lidar sensor to identify the state of connection of the trailer breakaway cable. For example, using the RVC data, the position of the breakaway cable is continuously monitored in the RVC views.

In embodiments, the system 100 uses applications to implement an information fusion process to integrate the unimodal estimations taking into consideration the level of uncertainty of each sensing modality and available a priori information such as image/signal quality, time of the day, and/or weather condition. Image quality is quantitively characterized using no-reference image quality assessment (NR-IQA) methods to decide whether to enhance or not and to fusion weight of the vision-based estimator.

In embodiments, system 100 implements an action state machine that generates alerts and recommends actions for the operator when operating the vehicle trailer combo based on the connection status of the 7-Pin trailer cable and trailer breakaway cable based on vehicle speeds and calibratable speed threshold.

Vehicle 10 is described herein as an automobile, such as a truck, a sport utility vehicle, a sedan, or other automobile type configured to tow a trailer. As can be appreciated, vehicle 10 is not limited to an automobile and can be another vehicle type configured to tow a trailer such as, but not limited to, a semi-truck, an off-road vehicle, a construction vehicle, a farming vehicle, etc.

As depicted in FIG. 1, vehicle 10 generally includes a chassis 12, a body 14, front wheels 16, and rear wheels 18. Body 14 is arranged on chassis 12 and substantially encloses components of vehicle 10. Body 14 and chassis 12 may jointly form a frame. The vehicle wheels 16-18 are each rotationally coupled to the chassis 12 near a respective corner of the body 14.

As shown, vehicle 10 generally includes a propulsion system 20, a transmission system 22, a steering system 24, a brake system 26, a sensor system 28, an actuator system 30, at least one data storage device 32, at least one controller 34, and a communication system 36 to another vehicle 48 (or remote server system etc.). The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences the position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 (i.e., the multimodal sensors) includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, vehicle 10 may also include interior and/or exterior vehicle features not illustrated in FIG. 1, such as various doors, a trunk, and cabin features such as air, music, lighting, touch-screen display components, and the like.

The data storage device 32 stores data that can be used in controlling the vehicle 10. The data storage device 32 may be part of controller 34, separate from controller 34, or part of controller 34 and part of a separate system.

The controller 34 (i.e., vehicle controller) includes at least one processor 44 (integrate with system 100 or connected to the system 100) and a computer-readable storage device or media 46 for the multimodal sensing and applications associated with the state action machine described. The processor 44 (implemented for the multi-modal fusion data analysis, and the action state machine recommendations) may be any custom-made or commercially available processor, a central processing unit (CPU), a graphics processing unit (GPU), an application-specific integrated circuit (ASIC) (e.g., a custom ASIC implementing a neural network), a field-programmable gate array (FPGA), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions (for the various multi-modal monitoring/detection/sensing actions, and state machine logic analysis with vehicle speed and threshold calibration data) may include one or more separate programs, each of which includes an ordered listing of executable instructions for implementing logical functions. The instructions, when executed by the processor 44, receive and process signals (e.g., sensor data) from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, system 100 may include any number of additional sub-modules embedded within controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

An autonomous system may include a Level Four system which indicates "high automation", referring to the driving mode-specific performance by an automated driving system of all aspects of the dynamic driving task, even if a human operator does not respond appropriately to a request to intervene; and a Level Five system which indicates "full automation", referring to the full-time performance by an automated driving system of all aspects of the dynamic driving task under all roadway and environmental conditions that can be managed by a human operator.

Figure 2:
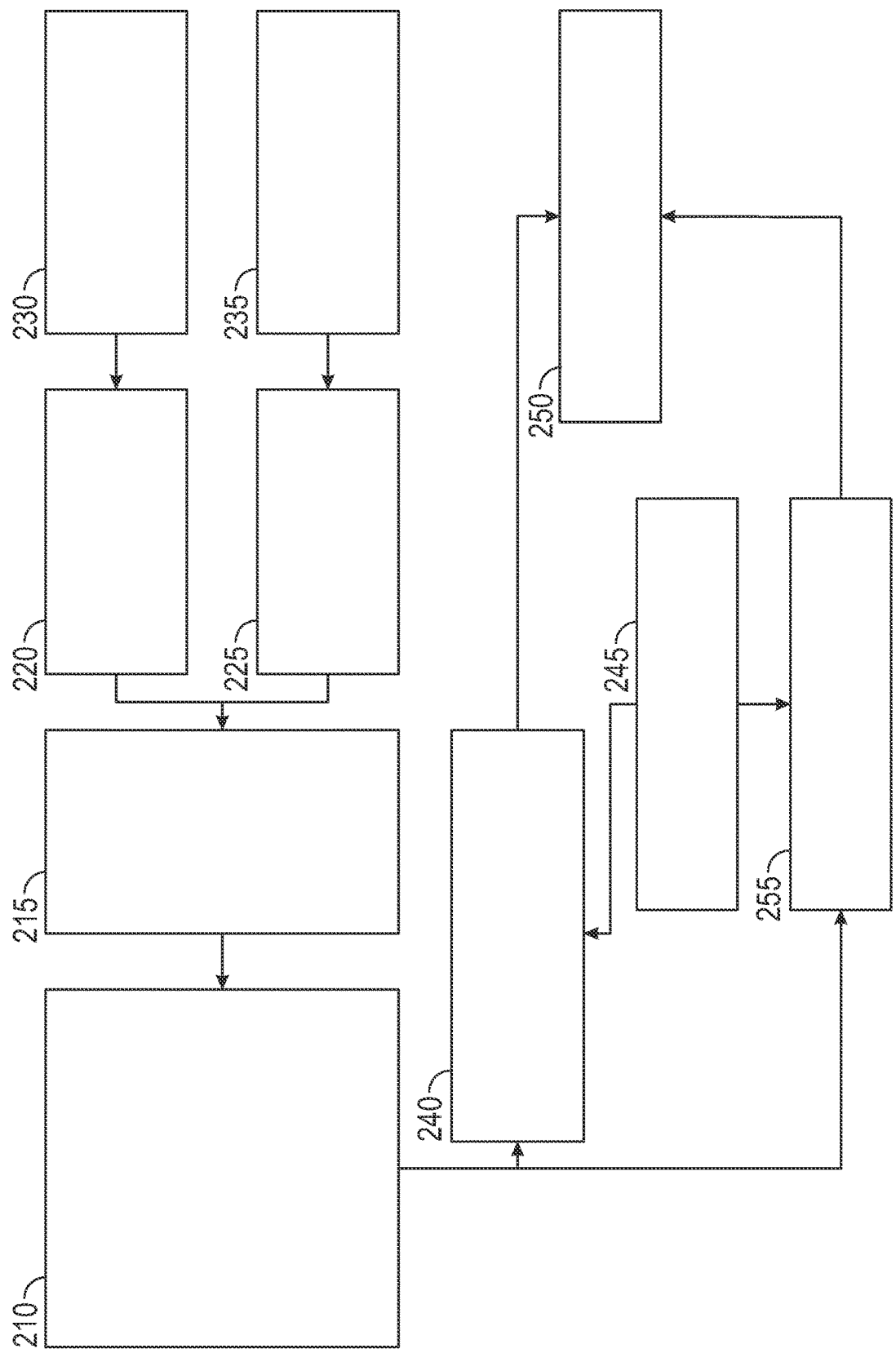
FIG. 2, illustrates a functional block diagram of the initiating, and monitoring by the multimodal sensors with the action state machine, and the trailer detection, in accordance with various embodiments.

With reference now to FIG. 2, a functional block diagram illustrates the initiating, and monitoring by the multimodal sensors with the action state machine, and the trailer detection, in accordance with various embodiments. As shown, in FIG. 2, the multimodal sensors 210 are coupled to an initiate function 215 that sends an initiate signal to the set of multimodal sensors based on presence detection of the trailer by either signaling from a trailer intake module presence detection system 220 that detects the brake lighting current consumption 230 of the trailer braking system, or by the rearview camera (RVC)-based trailer presence-detection system 225 that detects whether a coupler at the hitch location that is within the RVC view 235 has been coupled to the ball of the hitch of the vehicle. In embodiments, the initiate function 215 may be triggered by detections of either or both systems based on the trailer braking current consumption or the camera data showing the coupler at the hitch location.

In embodiments, the TIM-based trailer presence detection system 220 (and in instances, the RVC-based trailer presence detection system 225) may be communicatively coupled to one or more vehicle ports (VP), or one or more trailer ports (TP), and or integrated with one or more trailer path ports (TPP) to facilitate the communication of trailer information to the multimodal sensing systems for the trailer cable and the breakaway cable.

With continued reference to FIG. 2, the multimodal sensor trailer cable monitoring 240 (i.e., 7-Pin trailer cable or other trailer sized trailer cable pin connector), and the multimodal sensor trailer breakaway cable monitoring 255 both are configured to enable monitoring operating for enhanced performance based in part on priori information 245 that can include factors to cause adjustments in cable monitoring algorithms of time of day, weather conditions, time of year, and signal integrity.

Further, output from each of the monitoring operations, for example, the 7-pin trailer cable's state of the connection (from the multimodal sensor trailer cable monitoring 240), and trailer breakaway cable's state of the connection (from the multimodal sensor trailer breakaway cable monitoring 255) are communicated to the action state machine 250. The action state machine 250 with inputs from the vehicle controller of the vehicle speed and calibrated speed thresholds for a stationary vehicle, low-speed vehicle, and a high-speed vehicle generates a set of recommended actions as described in FIG. 3.

The multimodal sensors 210 provide sensing by devices including camera, radar, and Bluetooth®/Wi-Fi® operated devices of the trailer cable connection statuses that are determined by fusing together using an information fusion algorithm one or more types of signal data of the devices configured for use by the multimodal sensors that includes generated optical signal data, radio signal data, and range signal data.

Figure 3:
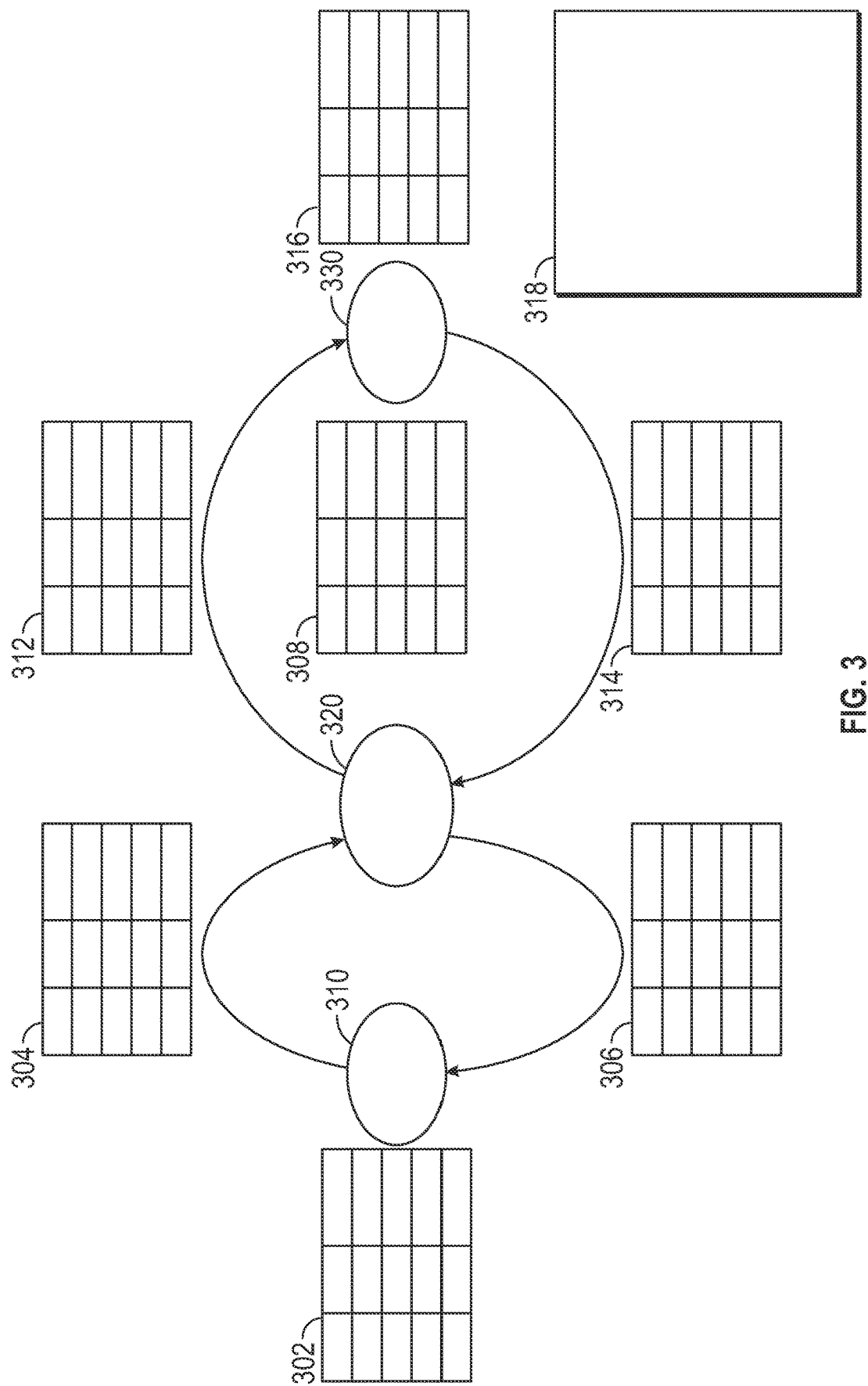
FIG. 3 illustrates an exemplary embodiment of the state action machine recommendations based on vehicle speed and calibratable speed thresholds of stationary, low-speed, and high-speed of the vehicle in accordance with various embodiments.

With reference to FIG. 3, FIG. 3 illustrates an exemplary embodiment of the state action machine recommendations based on vehicle speed and calibratable speed thresholds of stationary, low-speed, and high-speed of the vehicle in accordance with various embodiments.

In FIG. 3, there is shown a set of recommendations from the action state machine for a stationary vehicle 310, a vehicle at a low speed 320, and a vehicle at a high speed 330. The set of recommendations from the action state machine include the set of recommendations that are defined as follows: "0" for "no action" recommended, "1" for "breakaway cable alert", "2" for "7-pin cable alert", "3" for "safety walkthrough" recommended, "4" for recommended "vehicle brake", "5" for "avoiding hard braking" recommended, "6" for "slowdown safely" recommended, and "7" for "pull-over" recommended. The set of recommendations of the set of 1 to 7, is merely exemplary, and it is contemplated, that the set is not limited or static, but is dynamic and may be expanded, changed, or modified depending on a variety of factors that include the location of the vehicle, the kind of trailer-vehicle combination, the roadway (highway, curvy road, straight road, incline, uphill, etc.), weather condition (i.e., time of year), congestion of vehicles on the roadway, driver profile information including operator experience, etc., and weight of the trailer and vehicle.

In embodiments, the recommendations may be configured with alerts that include images of the cable statuses displayed to the operator on vehicle displays, audible alerts, and visual alerts. The recommendations may be configured with natural language processing for more sophisticated phrases, such as a recommendation for a walkthrough at a rest station in 5 miles, etc. In other embodiments, the recommendations may trigger autonomous vehicle controls such as braking of vehicle and trailer if there is a disconnection event, notification on mobile devices of the operator, and recommended vehicle operations in the near future based on historic (priori information) data or intelligent algorithms.

In embodiments, in FIG. 3, for a stationary vehicle 310, the actions for various 7-pin and a breakaway cable (or eBrake cable) states of "ON" and "OFF" are shown in logic table 302 that includes for statuses of both cables connection "ON" of "0" or no action, where the 7-pin cable status is connected (or stable) but the breakaway cable status is not of "1" or an "breakaway cable alert", likes if the 7-pin cable status OFF, and it is not connected, not stable, likely to be disconnected, etc . . . then the action state machine issues a "2" action or a "7-pin cable alert", and finally, if neither cables are connected both have an OFF status are not stable in connection, likely to be disconnected, etc., then actions of "1-2-3" are issued by the action state machine of the "breakaway cable alert", the "7-pin cable alert" and "3" of a recommended "safety walkthrough".

In embodiments, as the vehicle is no longer in the stationary state, and is operating towards a vehicle at low speed 320 or operating vice versa from a low speed 320 to a stationary vehicle 310, the action recommendations are slightly modified to include the recommendation of "7" to "pull-over" when either or both of the cable statuses are OFF and both cables are not connected, likely to disconnect, not stable in connection, etc . . . as shown in the logic table 304 when the vehicle operates towards a low-speed, and the logic table 306 when the vehicle operated from the low-speed towards the stationary speed. As an example, when both cables are disconnected or likely to disconnect, the actions triggered with OFF statuses for both cables are 1-2-7-3 of an breakaway cable alert, 7-pin cable alert, pull-over, and safety walkthrough.

When the vehicle is operating from a low speed 320 to a high speed 330, the actions issued by the state action machine are modified slightly from those actions recommended in logic table 308 of "1, 2, 7 and 3" for the set of cable statuses, to include the set of actions shown in logic table 312 when going towards the high speed 330, and the set of actions shown in logic table 314 when going from the high speed 330 to the low speed 320. In logic table 312, the recommendations include action "5" to avoid "hard braking" if the breakaway cable status is OFF, and if both are cable statuses are OFF, the recommended actions remain the same as at a low speed 320. In logic table 314 when slowing down from a high vehicle speed, the recommended actions in the case of the 7-pin cable status OFF with breakaway cable status ON include "4" of recommended vehicle brake. If the breakaway cable status is OFF and the 7-pin cable status is ON, then recommended actions include "6" to slow down safely. Finally, for the high speed 330, the logic table 316 includes if the breakaway cable status OFF, "5" and to avoid hard braking. The combinations shown in the various logic table may be programmed to include more or fewer action sets as desired based on operating data, and historic data as well as the other factors mentioned earlier.

Figure 4:
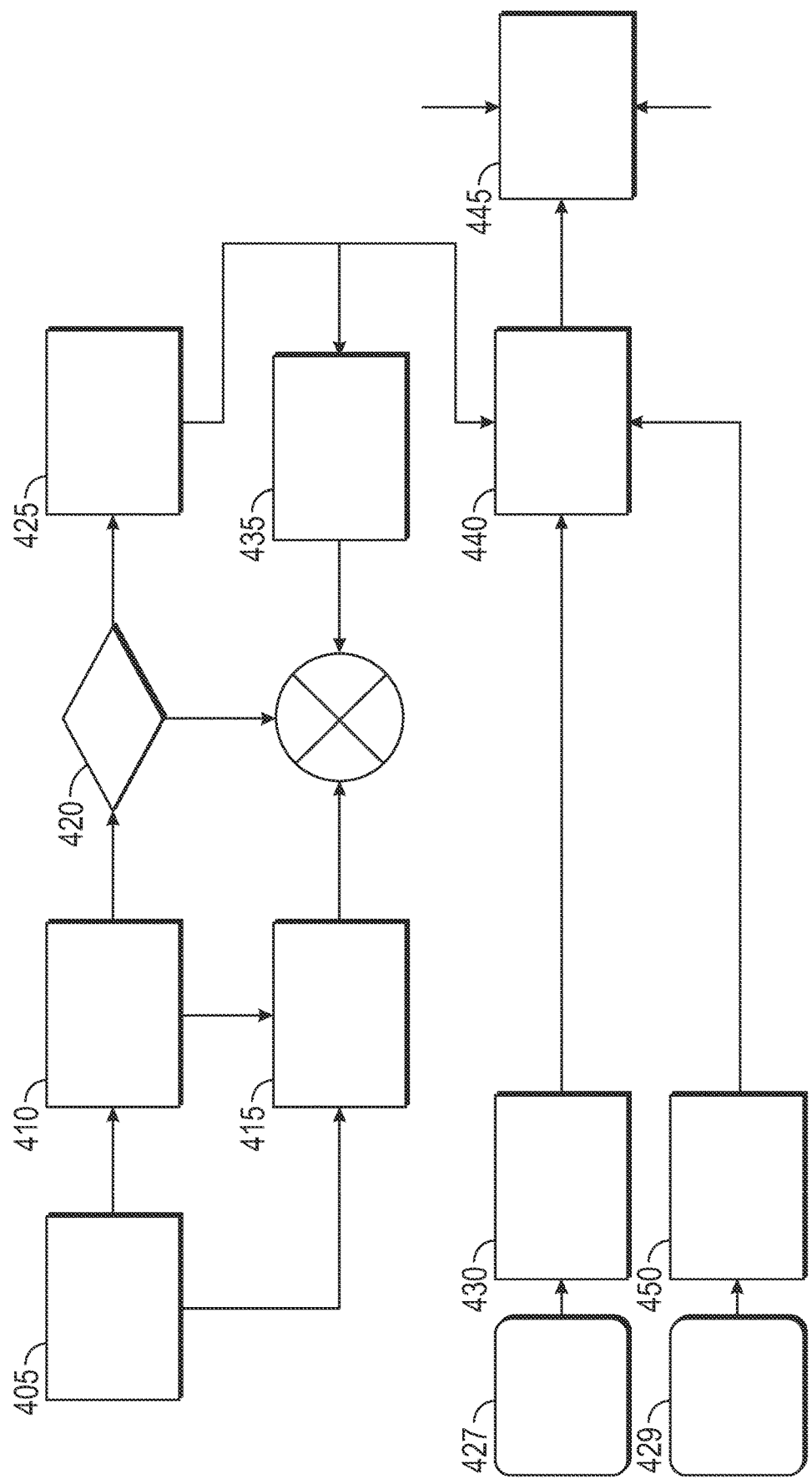
FIG. 4 illustrates functional diagrams of the range, radio, and image sensing combined with probability detection that weights the detection probability of the cable connection detections by the different multimodal sensors in the fusion process for input to the action state machine of the multimodal sensing system, in accordance with various embodiments.

With reference to FIG. 4, FIG. 4 illustrates functional diagrams of the range, radio, and image sensing combined with probability detection that weights the detection probability of the cable connection detections by the different multimodal sensors in the fusion process for input to the action state machine of the multimodal sensing system, in accordance with various embodiments. In FIG. 4, there is for the image sensing process using the rearview camera that captures images of the 7-pin and breakaway cable connection a processing functional pipeline of the Rear View Camera (RVC) 405 capturing images of the cables in a sequence. Next, apply an image quality index (IQI) to determine the quality of the image for cable status detection. For example, due to motion, the image capture may be blurry and require further image stabilization, or there may be saturation of pixels due to sunlight causing the image quality to be reduced. In either case, an image quality analysis is performed at 420, if the image is deemed not of sufficient quality based on a threshold quality index then an appropriate weighting 435 based on the IQI and/or an image enhancement 415 may be applied.

In embodiments, the vision data from RVC 405 and radio signals 427 from ultrawideband (UWB)/Bluetooth® connected sensors, and/or range signals 429 from ultrasonic, radar, or lidar sensors can be used to identify the state of connection of the 7-pin trailer cable. For example, using RVC data, the position of the 7-pin socket is fixed when compared to the position of the rear bumper by zooming a small window of the 7-pin socket and detecting cable status using positional images of the 7-pin socket, the bumper, and the cable for the detection of the 7-pin cable status. In embodiments, the RVC 405 captures a sequence of images by auto-detecting a region of interest defined with respect to a certain location (e.g., in a middle point) of a rear bumper of the vehicle. The vehicle bumper is then segmented into a set of regions of images based on optical flow followed by more segmenting of image captures that include foreground images and making comparisons using algorithms for positional changes of the cable socket, cables, and other changes. For example, in embodiments, a color sticker may be attached to one or both or the cables to identify the cable and to assist in image detection by regional image segmentation and comparisons the tagged cable by the color sticker is likely to become loose from the socket, is not plugged in firmly or is loosely-plugged when connected.

In embodiments, the radio signals 427 for the wireless-based 7-pin detection and brake cable detection are sent for fusing processing by the fusion processor 440, with a probability factor that assesses the accuracy of the detection to the other types of multimodal sensor detections of the range signals 429 for the range based detection 450, and the vision-based detection 425. Each of the multimodal types of detection of wireless, range, and vision are each assigned appropriate probability detection factors for the detection result data that are fused together by an algorithm of the fusion processor 440 and sent to the action state machine 445 that generates actions based on the cable statutes at various calibration speed thresholds.

In embodiments, the algorithm of the fusion processor 440 integrates the unimodal estimations taking into consideration the level of uncertainty of each sensing modality and available prior information, and is described as follows:

$$\begin{cases} \text{Connected } \textit{iff } Sig\left(\frac{w_v}{w_v + w_w + w_r}p_v + \frac{w_w}{w_v + w_w + w_r}p_w + \frac{w_r}{w_v + w_w + w_r}p_r\right) \geq T \\ \text{Disconnected otherwise} \end{cases}$$

$p_v$: the probability of cable detection by vision-based estimator with variance $\sigma_v$;

$p_w$: the probability of cable detection by wireless-based estimator with variance $\sigma_w$;

$p_s$: represents the probability of cable detection by range-based estimator with variance $\sigma_r$; and $w_w$, $w_v$ and $w_s$: weight to aggregate the multiple predictions. Weight is inversely proportional to the variance. Very low weight is given to the visual modality if IQI<$T_Q$.

$C_s$: cable connection state (connected, disconnected).

T: calibratable detection threshold.

Figure 5:
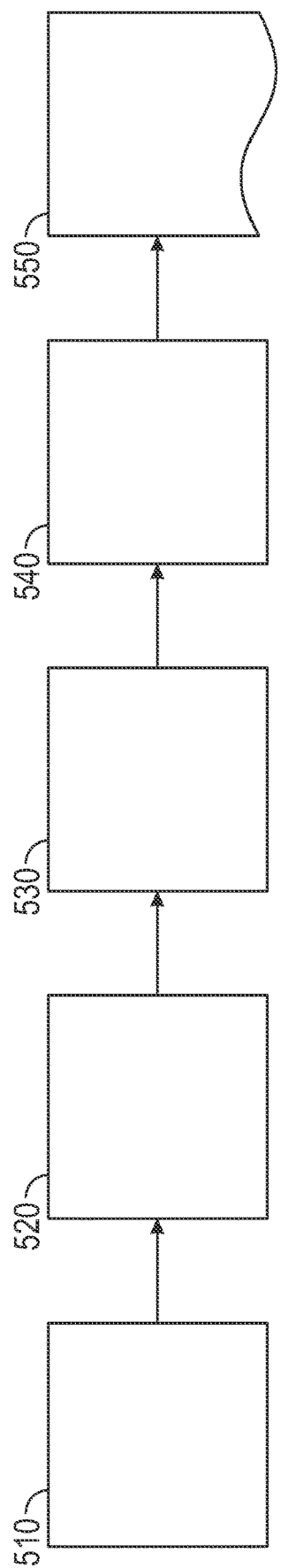
FIG. 5 illustrates a functional diagram of monitoring the e-brake cable in RVC view of the cable monitoring system in accordance with various embodiments.

With reference to FIG. 5, FIG. 5 illustrates a functional diagram of monitoring the e-brake cable in RVC view of the cable monitoring system in accordance with various embodiments.

In FIG. 5 in the functional flow diagram for the visual detection of the multimodal sensing system, a sequence of images capture by the RVC 510 are defined at stage 520 into a region or frame that focuses on the area of the central rear bumper of the vehicle captured in the images by the RVC view. Then the system applies a segmentation operation at stage 530 to the defined bumper region based on the optical flow (i.e., an optical flow is a visual technique used for motion estimation, object tracking, and activity recognition) to determine whether the cables are connected, loose, not fixed properly, etc . . . by the cable position by comparison operations of regions of the rear bumper to differences in motion of the cable position. As an example of this optical flow of the image motion that is tracked and compared, at stage 540, a foreground segmentation of the image is compared to the road texture in the image for position changes and motion activity of cables. The changes and activity are analyzed by optical flow algorithms, and at stage 550, a report is generated of the estimations and activities with determinations of the cable status.

Figure 6:
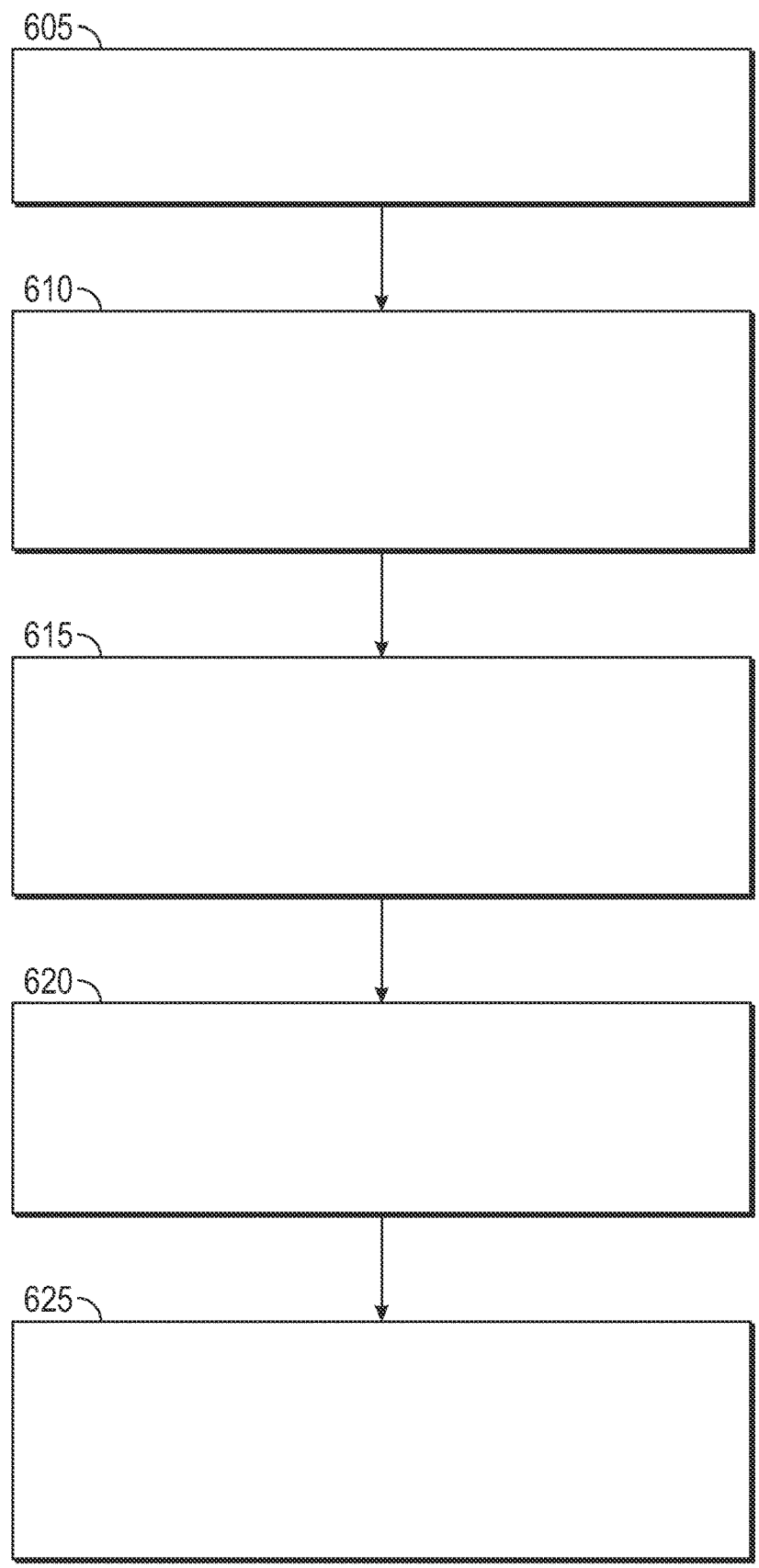
FIG. 6 illustrates a flowchart of operations of the multimodal sensor monitoring and detecting to determine the pin connector cable and the brake cable statuses, and of the range, radio, and image sensing combined with probability detection that weights the detection probability of the cable connection detections by the different multimodal sensors in a fusion process for input to the action state machine of the multimodal sensing system, in accordance with various embodiments.

FIG. 6 illustrates a flowchart of operations of the multimodal sensor monitoring and detecting to determine the pin connector cable and the brake cable statuses, and of the range, radio, and image sensing combined with probability detection that weights the detection probability of the cable connection detections by the different multimodal sensors in a fusion process for input to the action state machine of the multimodal sensing system, in accordance with various embodiments. At step 605, the cable monitoring system is initiated by a monitor function upon detection of a presence of the trailer connected to the vehicle by at least one sensor of the set of multimodal sensors integrated with the vehicle. As an example, the monitoring cable system based on an initiate signal generated by an initiate function sends a signal to the set of multimodal sensors based on presence detection of the trailer by either signaling from a trailer intake module presence detection system which detects the brake lighting current consumption of the trailer braking system, or by the rearview camera (RVC)-based trailer presence-detection system which detects whether a coupler at the hitch location that is within the RVC view has been coupled to the ball of the hitch of the vehicle. The initiate function may generate the start or initiate signal by either detection of the trailer by the power consumptions of the braking systems or vision flow detections of the trailer hitch connected at the hitch location.

At step 610, the cable monitoring system monitors the statuses of the set of cable connections based on connection data generated by the set of multimodal sensors integrated with the vehicle by fusing together using an information fusion algorithm one or more types of signal data from the set of multimodal sensors of optical signal data, radio signal data, and range signal data.

At step 615, the cable monitoring system sends detection results of cable statuses to an action state machine that generates a set of recommended actions to the operator of the vehicle trailer combination based on logical relationships of connections status of both the pin connector cable and the breakaway cable which is tied together with one or more vehicle states or operation of a stationary vehicle, a low-speed vehicle, and a high-speed vehicle. That is, the action state machine, generates one or more action sets based on a combination set of logical pairs including a cable connector state and a brake action state, and with a respective vehicle action state of the stationary vehicle, the low-speed vehicle, and the high-speed vehicle.

At step 620, the cable monitoring system implements an information fusion algorithm based on different weighting associated with a set of multiple probability detection inputs including probabilities of detection of the optical signal data, probabilities of detection of the radio signal data, and probabilities of detections of the range data received by one or more sensors of the set of the multimodal sensors to determine the current cable connection statuses of the set of cables coupled between the trailer and vehicle.

At step 625, the cable monitoring system for enhancements of the monitoring and determining of the current cable connection statuses, and particularly for better vision detection and analysis, additional information is utilized by the detection and determination algorithms that include priori information of at least signal quality, weather conditions, and time of data.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for monitoring multiple cable connections between a trailer and a vehicle, the system comprising:
   a trailer cable monitoring device disposed within the vehicle;
   a trailer cable; and
   a breakaway trailer cable;
   wherein the trailer cable and the breakaway trailer cable are configured to provide a set of cable connections between the trailer and the vehicle, wherein the trailer cable monitoring device is configured to:
      monitor the set of cable connections from connection data generated by a set of multimodal sensors integrated with the vehicle about statuses of the cable connections between the trailer and the vehicle;
      initiate a monitor function upon detection of a presence of the trailer connected to the vehicle by at least one sensor of the set of multimodal sensors integrated with the vehicle; and
      determine the statuses of the cable connections by fusing together using an information fusion algorithm one or more types of signal data from the set of multimodal sensors comprising optical signal data, radio signal data, and range signal data.

2. The system of claim 1, further comprising:
   wherein the trailer cable monitoring device is configured to:
   initiate the monitor function by a Trailer-Interface (TIM) based trailer presence detection of current consumption by a trailer braking light.

3. The system of claim 1, further comprising:
   wherein the trailer cable monitoring device is configured to:
   initiate the monitor function by a rear-view camera (RVC) based trailer detection of a coupler at a hitch location located within an RVC view.

4. The system of claim 3, further comprising:
   wherein the trailer cable comprises at least one cable connector comprising a 7-pin cable connector.

5. The system of claim 4, further comprising:
   wherein the trailer cable monitoring device is configured to:
   implement an action state machine associated with one or more vehicle states comprising a stationary vehicle, a low-speed vehicle, and a high-speed vehicle.

6. The system of claim 5, further comprising:
   wherein the trailer cable monitoring device is configured to:
   implement the action state machine that receives a set of inputs of vehicle operating attributes comprising vehicle speed, and calibrated speed thresholds, and the statuses of the cable connections, and the trailer breakaway cable.

7. The system of claim 6, further comprising:
   wherein the action state machine generates one or more action sets based on a combination set of logical pairs comprising a cable connector state and a brake action state, and with a respective vehicle action state of the stationary vehicle, the low-speed vehicle, and the high-speed vehicle.

8. The system of claim 7, further comprising:
   wherein the one or more action sets comprise alerts of no action, brake cable alert, cable connector cable alert, safety walkthrough, recommend vehicle brake, avoid hard brake, slow down safely, and pull over.

9. The system of claim 1, further comprising:
   wherein the trailer cable monitoring device is configured to:
   implement an information fusion algorithm based on different weighting associated with a set of multiple probability detection inputs comprising probabilities of detection of the optical signal data, probabilities of detection of the radio signal data, and probabilities of detections of the range data received by one or more sensors of the set of multimodal sensors.

10. The system of claim 1, further comprising:
    wherein the trailer cable monitoring device is configured to:
    monitor the set of cable connections from the connection data generated by the set of multimodal sensors based on priori information that comprises at least signal quality, weather conditions, and time of data.

11. A method for monitoring multiple cable connections between a trailer and a vehicle, the method comprising:
    configuring a trailer cable monitoring device that is disposed within the vehicle for monitoring a set of cable connections of a trailer cable, and a breakaway trailer cable between the trailer and the vehicle by:

monitoring statuses of the set of cable connections based on connection data generated by a set of multimodal sensors integrated with the vehicle;

initiating a monitor function upon detection of a presence of the trailer connected to the vehicle by at least one sensor of the set of multimodal sensors integrated with the vehicle; and determining statuses of cable connections by fusing together using an information fusion algorithm one or more types of signal data from the set of multimodal sensors comprising optical signal data, radio signal data, and range signal data.

12. The method of claim 11, further comprising:
initiating, by the trailer cable monitoring device, by a Trailer-Interface (TIM) based trailer presence detection of current consumption by a trailer braking light.

13. The method of claim 12, further comprising:
initiating, by the trailer cable monitoring device, the monitor function by a rear-view camera (RVC) based trailer detection of a coupler at a hitch location located within an RVC view.

14. The method of claim 13, further comprising:
wherein the trailer cable comprises at least one cable connector comprising, a 7-pin cable connector.

15. The method of claim 14, further comprising:
implementing, by the trailer cable monitoring device, an action state machine associated with one or more vehicle states comprising a stationary vehicle, a low-speed vehicle, and a high-speed vehicle.

16. The method of claim 15, further comprising:
applying, by the trailer cable monitoring device, the action state machine by receiving a set of inputs of vehicle operating attributes comprising vehicle speed, and calibrated speed thresholds, and the statuses of cable connections, and the trailer breakaway cable.

17. The method of claim 16, further comprising:
generating, by the action state machine, one or more action sets based on a combination set of logical pairs comprising a cable connector state and a brake action state, and with a respective vehicle action state of the stationary vehicle, the low-speed vehicle, and the high-speed vehicle wherein the one or more action sets comprise at least an alert with an image of the cable connection state associated with the alert.

18. The method of claim 17, further comprising:
implementing, by the trailer cable monitoring device, an information fusion algorithm based on different weighting associated with a set of multiple probability detection inputs comprising probabilities of detection of the optical signal data, probabilities of detection of the radio signal data, and probabilities of detections of the range data received by one or more sensors of the set of the multimodal sensors.

19. The method of claim 11, further comprising:
monitoring, by the trailer cable monitoring device, the set of cable connections from the connection data generated by the set of multimodal sensors based on priori information that comprises at least signal quality, weather conditions, and time of data.

20. An apparatus to monitor cable connections between a trailer and a vehicle, the apparatus comprising:
a processor that is disposed in a trailer cable monitor device and is programmed with a set of instructions to monitor connection statuses of a trailer cable and a breakaway cable;

the processor is configured to receive connection data generated by a set of multimodal sensors integrated with the vehicle about the statuses of the cable connections between the trailer and the vehicle;

the processor is configured to initiate a monitor function upon detection of a presence of the trailer connected to the vehicle by at least one sensor of the set of multimodal sensors integrated with the vehicle to implement an information fusion algorithm based on different weighting associated with a set of multiple probability detection inputs comprising probabilities of detection of optical signal data, probabilities of detection of radio signal data, and probabilities of detections of range signal data received by one or more sensors of the set of the multimodal sensors;

the processor is configured to fuse together using an information fusion algorithm one or more types of signal data from the set of multimodal sensors comprising the optical signal data, the radio signal data, and the range signal data to determine the statuses of the cable connections; and the processor is configured to implement an action state machine that receives a set of inputs of vehicle operating attributes comprising vehicle speed and calibrated speed thresholds, and the statuses of the cable connections to generate one or more action alerts.

* * * * *